United States Patent
Kloth (10) Patent No.: US 7,489,834 B2
(45) Date of Patent: Feb. 10, 2009

(54) METHOD AND APPARATUS FOR IMAGE PROCESSING

(75) Inventor: Axel K. Kloth, Mountain View, CA (US)

(73) Assignee: Parimics, Inc., Saratoga, CA (US)

( * ) Notice: Subject to any disclaimer, the term of this patent is extended or adjusted under 35 U.S.C. 154(b) by 784 days.

(21) Appl. No.: 10/758,711

(22) Filed: Jan. 15, 2004

(65) Prior Publication Data

US 2004/0156546 A1 Aug. 12, 2004

Related U.S. Application Data (60) Provisional application No. 60/441,076, filed on Jan. 17, 2003.

(51) Int. Cl.
G06K 9/54 (2006.01)
G06K 9/60 (2006.01)
G06K 9/00 (2006.01)

(52) U.S. Cl. .................. 382/302; 382/181; 382/303; 382/304

(58) Field of Classification Search .......... 382/302, 382/303, 304, 181
See application file for complete search history.

(56) References Cited

U.S. PATENT DOCUMENTS

| 4,707,647 A | 11/1987 | Coldren et al. |
| 5,214,713 A | 5/1993 | Juvinall |
| 5,535,288 A | 7/1996 | Chen et al. |
| 5,535,291 A | 7/1996 | Spencer et al. |
| 5,706,290 A | 1/1998 | Shaw et al. |
| 5,713,037 A | 1/1998 | Wilkinson et al. |
| 6,405,185 B1 | 6/2002 | Pechanek et al. |
| 6,493,467 B1 | 12/2002 | Okuda et al. |

OTHER PUBLICATIONS

Chin et al., A Massively Parallel Processing System Based on a Hyper-crossbar Network, Frontiers of Massively Parallel Computation, Oct. 1988, pp. 463-466, especially p 465.
PCT Search Report PCT/US04/01035.
Office Action Non-Final Rejection U.S. Appl. No. 10/759,583 Dated Oct. 23, 2007.

*Primary Examiner*—John B Strege
(74) *Attorney, Agent, or Firm*—Townsend and Townsend and Crew LLP; Kenneth R. Allen (57) ABSTRACT

An image processing system processes images via a first processing layer adapted to perform object-independent processing, a second processing layer adapted to perform object-dependent processing, and a third processing layer adapted to perform object composition, recognition and association. The image processing system performs object-independent processing using a plurality of processors each of which is associated with a different one of the pixels of the image. The image processing system performs object-independent processing using a symmetric multi-processor. The plurality of processors may form a massively parallel processor of a systolic array type and configured as a single-instruction multiple-data system. Each of the plurality of the processors is further configured to perform object-independent processing using a unified and symmetric processing of N dimensions in space and one dimension in time. The plurality of processors are formed on a semiconductor substrate different from the semiconductor substrate on which images are captured.

13 Claims, 6 Drawing Sheets

METHOD AND APPARATUS FOR IMAGE PROCESSING

CROSS-REFERENCES TO RELATED APPLICATIONS

The present application claims benefit of the filing date of U.S. provisional application No. 60/441,076, filed on Jan. 17, 2003, entitled "Parallel Image Computation System", the content of which is incorporated herein by reference in its entirety.

FIELD OF THE INVENTION

The present invention relates to processing of image data, and more particularly to high-speed processing of image data.

BACKGROUND OF THE INVENTION

Recent advances in image capturing techniques have brought about a need for more efficient methods for processing image data, both for real-time or near real-time applications. Conventional computational systems are becoming increasingly less effective for large scale real time image processing. Conventional computational systems are also deficient when image processing is carried out for two or more spatial dimensions.

In conventional image processing systems, images are captured and gathered on a frame-by-frame basis. Thereafter, the pixels of the stored frames are sequentially accessed by one or more CPUs from one or more DRAM subsystems. This results in systems with a limited throughput. Such conventional image processing systems are often unable to provide the required processing speed if, for example, the frame rate is high, or the required resolution is high, or the total pixel count and the color depth per pixel is high, or the number of CPU instructions per pixel is high. This processing limitation is caused, in part, by the fact that the CPUs cannot access image data fast enough from the memory (i.e., DRAM) and/or or fetch code from the DRAM subsystem. Multiprocessor systems have been developed and deployed but because accesses to the DRAMs are limited due to contention and blocking, these systems are unable to process the frames at the required rates.

This problem is further compounded by the fact that the image processing requirement for a two-dimensional image with N×M pixels (typically $M=3\times N/4$ or $M=4\times N/5$) is a linear function of $N^2$. This results in either $3\times N^2/4$ or $4N^2/5$ multiplied by the number of instructions per pixel. Accordingly, as a linear image increases in size from $N_1$ to $N_2$, the image processing time increases by a factor equal to $N_1^2/N_2^2$.

Figure 1:
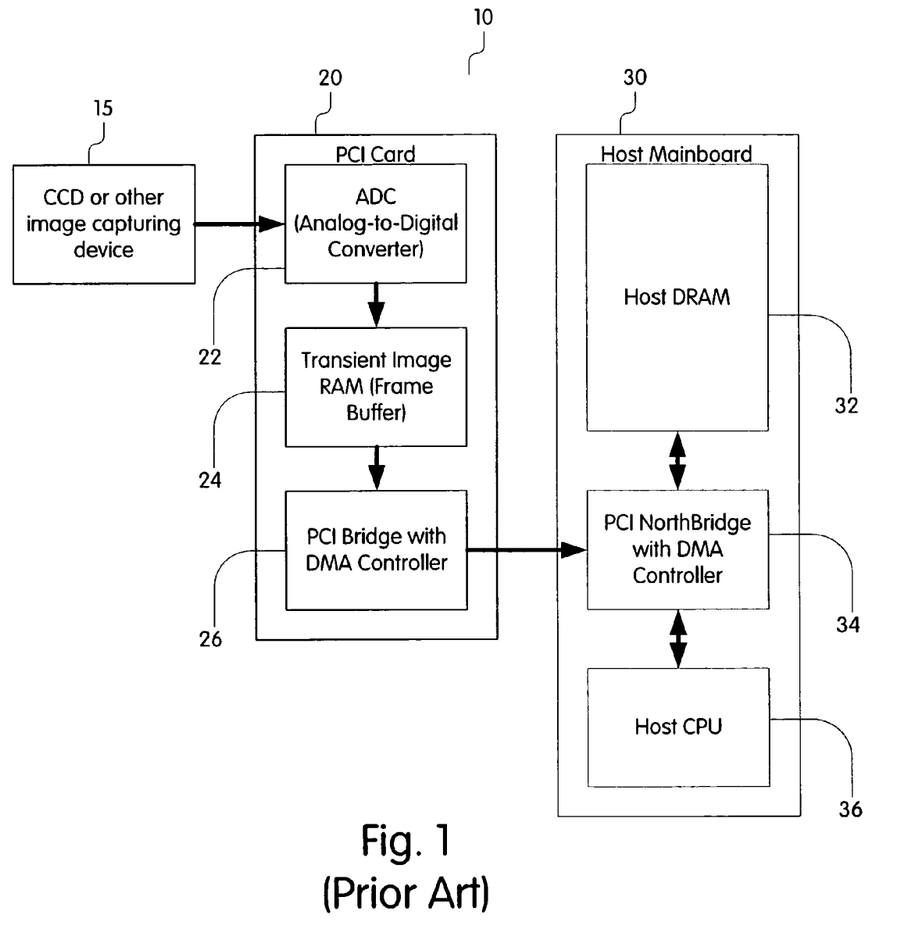
FIG. 1 is a simplified high-level block diagram of an image processing system, as known in the prior art.

FIG. 1 is a simplified block of a conventional image processing system 10. Image processing system 10 is shown as including CCD 15, PCI card 20 and host mainboard 30. CCD 15 is adapted to capture the images that are digitized by Analog-to-Digital Converter (ADC) 22 of PCI card 20. The digitized image data of an entire frame is then stored in frame buffer 24, also referred to as transient image RAM 24. Thereafter, the stored frame is transferred through a bridge, such as PCI Bridge 26 into host DRAM 32 of host mainboard 30 via either host mainboard 32's CPU, or a bridge DMA controller, such as the DMA controller (not shown) disposed in PCI NorthBridge 34. The data transferred and stored in the host DRAM 32 is subsequently accessed for further processing. The architecture of image processing system 10 is relatively inexpensive and can be built with standard parts and off-the-shelf processors; however, it has a limited throughput.

The increasing complexity of manufactured products and the requirement to consistently achieve high yields when manufacturing these complex products necessitates a high quality control and product inspection standards, such as those defined by ISO 9000 standards. Such quality control systems are often required to test a product (also referred to as a unit) under static conditions as well as when the unit is in operation. This requires high frame processing rates in order to provide the capability to tag defective units so as to reduce additional testing and adjust manufacturing process parameters in real time in order to increase yield. Despite their ever-increasing CPU performance, conventional image processing systems are not fully effective at handling such high frame processing rates, partly due to the latency associated with the DRAMs.

Another technique that has been developed to reduce the cost of image processing is to integrate the image capture and gathering operations—often done via a charge coupled device (CCD)—and some computational circuitry in one integrated circuit (IC). However, this technique decreases the image quality since a significant portion of the chip area is not light sensitive and cannot capture images. These ICs (also referred to as chips) typically include one processing engine per pixel that is physically formed on the chip adjacent or in the vicinity of that pixel (i.e., co-located with the pixel). Also, because these CCD chips are formed on a DRAM-type process, the speed of the processing engine of such chips is often limited, particularly, if the processing engines were configured to be software programmable. Moreover, the optical resolution of these chips deteriorates as the size of the co-located processing engines increases. Furthermore, these chips are only capable of capturing images in the range of the visible light, and thus fail to capture and process images generated by SONAR, RADAR, or light detection and ranging (LIDAR), and all other frequency ranges of the electromagnetic spectrum of waves.

Figure 2:
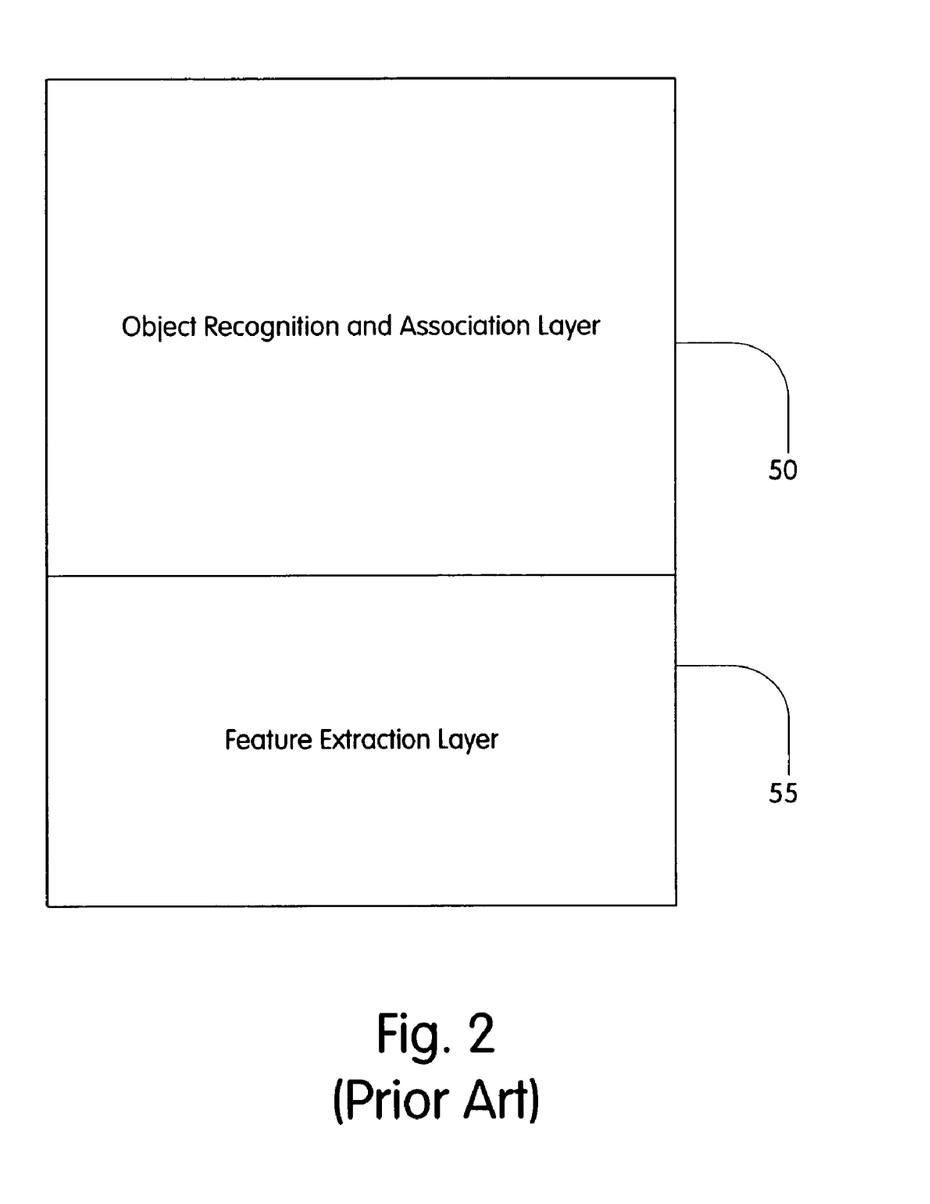
FIG. 2 shows various layers of image processing functions, as known in the prior art.

FIG. 2 shows processing image layer 50 and 55, in accordance with conventional image processing techniques. As known to those skilled in the art, layer 50 is adapted to perform object recognition and association. Layer 55 is adapted to perform feature extraction. Because, as seen from FIG. 2, the granularity of the layers is limited, prior art image processing systems are unable to map specific image processing tasks to hardware dedicated to perform these tasks.

BRIEF SUMMARY OF THE INVENTION

In accordance with the present invention, images are processed via a first processing layer (alternatively referred to hereinbelow as layer) adapted to perform object-independent processing, a second processing layer adapted to perform object-dependent processing, and a third processing layer adapted to perform object composition, recognition and association. The object-independent processing is adapted to be performed by a plurality of processors each of which is associated with a different one of the pixels of the image frame. The object-dependent processing is adapted to be performed by a symmetric multi-processor. The third processing layer may be further divided into object composition layer, object recognition layer and object association layer.

In some embodiments, the plurality of processors of the image processing system corresponding to the first layer, form a massively parallel processing system that is of a systolic array type and configured as a single-instruction multiple-data system. Each of the plurality of the processors is further configured to perform object independent processing using a unified and symmetric processing in N dimensions in space and one dimension in time.

Prior to being processed, images are captured via an image capturing device that may be a charged coupled device (CCD) and formed on a first semiconductor substrate. One ore more analog-to-digital converters may also be formed on the first semiconductor substrate to convert the captured analog image data to digital data. A realignment buffer realigns the data received from the analog-to-digital converters. The plurality of processors corresponding to the first layer are formed on a second semiconductor substrate that is separate from the first semiconductor substrate.

DETAILED DESCRIPTION OF THE INVENTION

Figure 3:
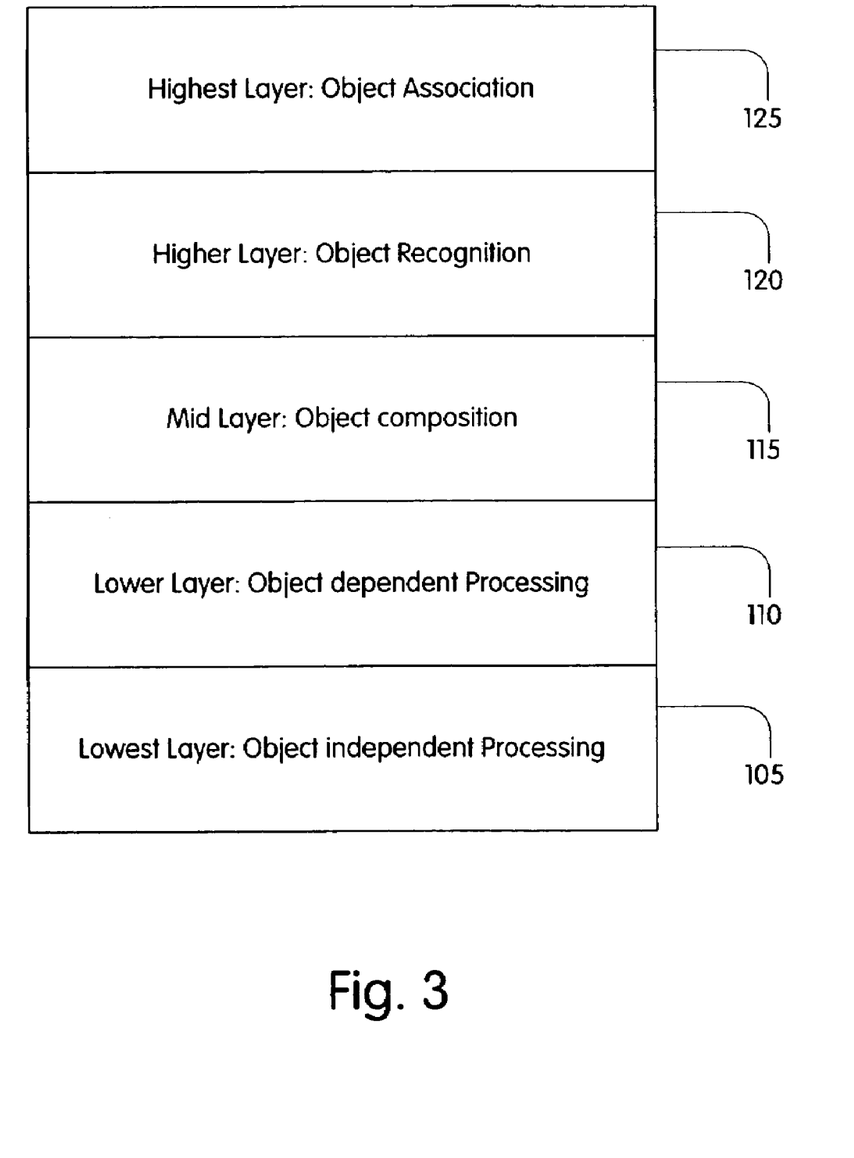
FIG. 3 shows various layers of image processing functions, in accordance with one embodiment of the present invention.

FIG. 3 shows various processing layers (alternatively referred to hereinbelow as layers) of an image processing system adapted to process images, in accordance with one embodiment of the present invention. The image processing system of the present invention is shown in FIG. 3 as including 5 layers, namely an object independent processing layer 105, an object dependent processing layer 110, an object composition layer 115, an object recognition layer 120, and an object association layer 125. It is understood that object composition layer 115, object recognition layer 120, and object association layer 125, in combination, correspond to object recognition and association layer 50, as shown in FIG. 2 and hence are not described below. It is further understood that object composition layer 115, object recognition layer 120, and object association layer 125 may be combined into, for example, two layers.

In accordance with the present invention, object independent processing layer 105, may be mapped onto (i.e., performed by) a massively parallel processor (MPP) or systolic array (shown in FIG. 5), and the object dependent processing layer 110, may be mapped onto a symmetric multi-processor system (SMP), a uniprocessor, or an MPP. In one embodiment, the MPP may be an image processing engine (IPE), and the SMP may be a post processing engine (PPE), as described further below. FIG. 6 is a simplified high-level block diagram of an image processing system 400, in accordance with one embodiment of the present invention. As seen from FIG. 6 and described in detail below, system 400 includes, in addition to other components, an IPE 200, a PPE 500. It is understood that object-independent processing refers to processing of pixel data that have not been associated with any objects and object-dependent processing refers to processing of data that have been associated with objects.

Figure 4:
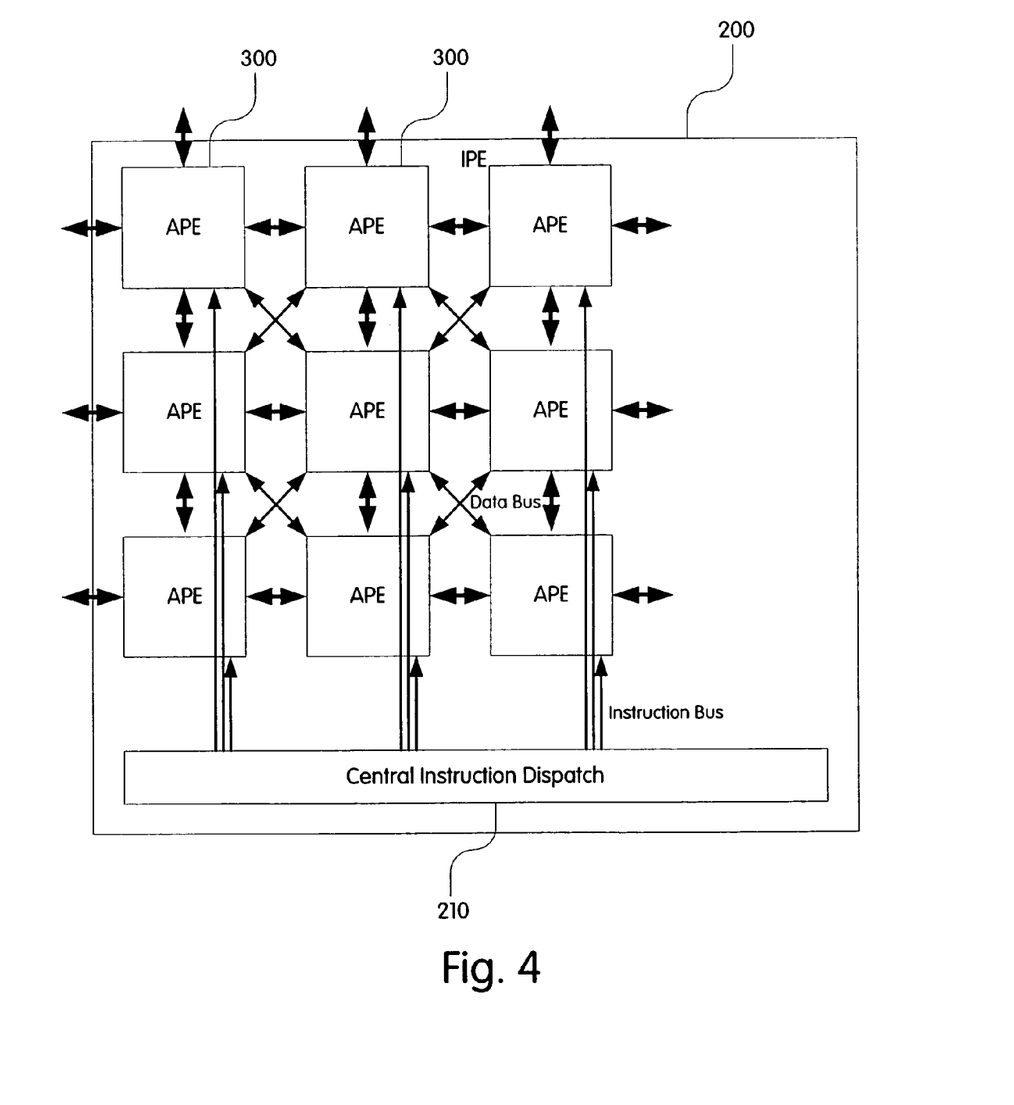
FIG. 4 is a simplified high-level block diagram of an image processing engine, in accordance with one embodiment of the present invention.

FIG. 4 is a simplified high-level block diagram of an IPE 200 that is adapted to perform the tasks associated with layer 105 (see FIG. 3). IPE 200 includes, in part, an array of atomic processing engines 300 (alternatively referred to hereinbelow as atomic processing elements), and a central instruction dispatch unit 210. As shown in FIG. 4, each atomic processing element (APE) is adapted to communicate with and exchange data with a neighboring APE. Each APE 300 is associated with one pixel and thus is dedicated to perform the image processing functions for that pixel. In accordance with the present invention, IPE 200 (and thus APEs 300) is formed on a semiconductor substrate that does not include any image capturing circuitry. In some embodiments, for each PPE, there may be four IPEs (i.e., IPE to PPE ratio of four). In other embodiments, this ratio may be smaller than four.

In FIG. 4, the topological distance between neighboring APEs is shown as being equal to one. In other embodiments (not shown) the topological distance between neighboring APEs may be greater than one, in which case, the neighbors may not be immediate neighbors. The neighbors, regardless of whether they are immediate neighbors or not, may have a spatial or timing relationship, or a combination thereof. In a two-dimensional array, such as that shown in FIG. 4, each APE 300 is formed so as to have eight immediate neighbors with a topological distance of one. In a three-dimensional array, each APE 300 is formed so as to have twenty-six immediate neighbors. It is understood that neighboring pixels, whether they are immediate neighbors or nor, may be assigned different weight coefficients, as required by the convolution operation.

Figure 5:
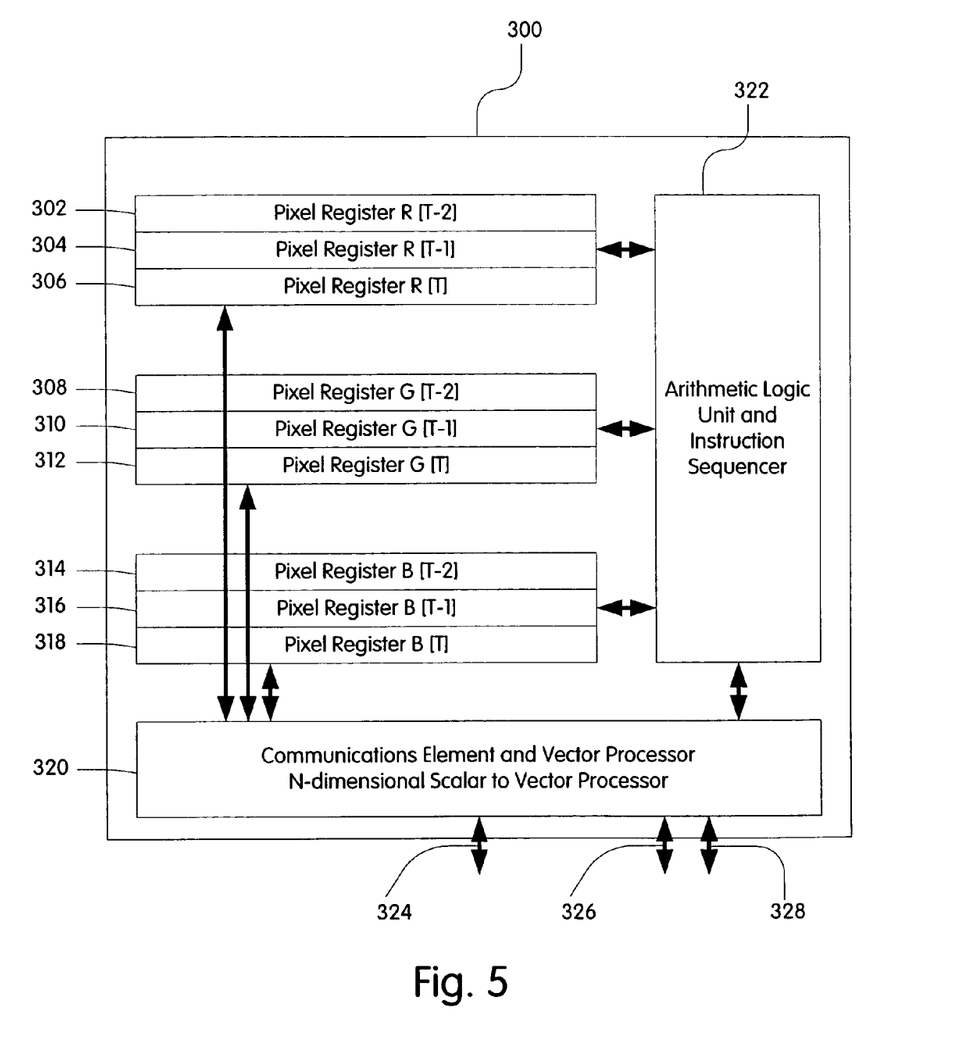
FIG. 5 is a simplified high-level block diagram of each atomic processing engine disposed in the image processing engine of FIG. 4, in accordance with one embodiment of the present invention.
Figure 6:
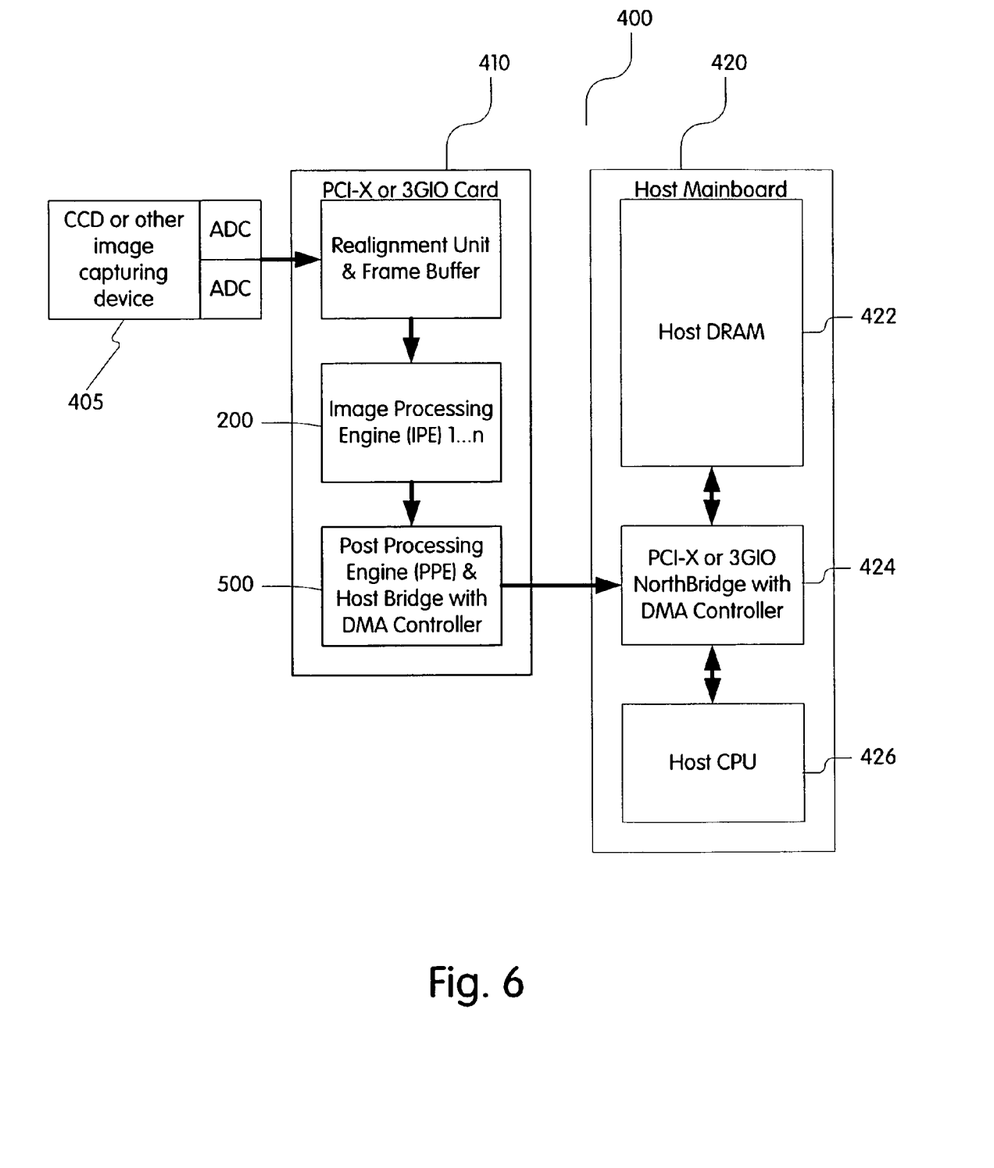
FIG. 6 is a simplified high-level block diagram of an image processing system, in accordance with one embodiment of the present invention.

FIG. 5 is a high-level block diagram of each APE 300. In FIG. 5 each APE 300 is shown as having has three associated registers each associated with colors red, green and blue. It is understood that in other embodiments, for frequencies falling outside the visible spectrum, such as ultraviolet or infrared, or for electromechanical phenomena, such as sound waves, APE 300 associates three different wavelengths to the respective red, green and blue registers. For example, in these embodiments, APE 300 is adapted to associate sound waves falling in the frequency range F1 to F2 to color red, sound waves falling in the frequency range F2 to F3 to color green, and sound waves falling in the frequency range F3 to F4 to color blue.

Referring to FIG. 5, color red is shown as having associated registers 302, 304, and 306. Color green is shown as having associated registers 308, 310, and 312. Color blue is shown as having associated registers 312, 314, and 316. Each of these registers is configured to have, e.g., 8 bits. Disposed in each APE 300 is a communication interface and vector processor 320 that is configured to communicate with other APEs. Pixel data associated with color red and corresponding to times T-2, T-1, and T are respectively stored in registers 302, 304, and 306. Pixel data associated with color green and corresponding to times T-2, T-1, and T are respectively stored in registers 308, 310, and 312. Pixel data associated with color blue and corresponding to times T-2, T-1, and T are respectively stored in registers 314, 316, and 318.

During each cycle, data is loaded into registers 306, 312, and 318 from communication interface and vector processor 320. With each cycle, new data is loaded into registers 306, 312, and 318, the data previously loaded into registers 306, 312, and 318 is shifted and stored, respectively, in registers 304, 310, and 316, and the data previously loaded into registers 304, 310, and 316 is shifted and stored, respectively, in registers 302, 308, and 314. Furthermore, during each cycle, the data in each of registers 302, 304, 306, 308, 310, 312, 314, 316, and 318 may be accessed by arithmetic logic unit and instruction sequencer (hereinafter alternatively referred to as ALU) 322 of APE 300, modified by ALU 322, and written back to that register by ALU 322. Data shifted out of registers 302, 308, and 314 is transferred outside its respective APE, via the APE's associated communication interface and vector processor 320.

ALU 322 is further configured to transfer data to communication interface and vector processor 320. The instructions performed on the data may be transferred between ALU 322 and communication interface and vector processor 320. Communication interface and vector processor 320 receives from and delivers data to neighboring APEs via data bus 324. Communication interface and vector processor 320 as well as ALU 322 receive instructions from central instruction dispatch 210 (see FIG. 4) via instruction bus 326, and deliver status information (e.g., error messages) to central instruction dispatch 210 via status bus 328.

IPE 200 outputs data in a format that is specific to it. Data output by IPE 200 may be either an image frame that is modified, or may be a pixel representation of the image frame, or a vector representation of the objects in the image frame, or the unmodified image frame. This information can be used to generate a set of vectors describing the objects in the frame. IPE 200 is further adapted to extract features and deliver the extracted features to the PPEs for post processing.

The following is a description of one known algorithm for determining motion vectors, as performed, for example, by IPE 200 and PPE 500 of the image processing system 400 of FIG. 6. IPE 200 determines motion vectors or perimeters (also referred to hereinbelow as edge) in the form of $(a_2-a_1, b_2-b_1)$, where a and b refer to any scalar associated with a pixel corresponding to the perimeter of that object.

IPE 200 is also configured to determine the gradient between any two scalars of neighboring pixels. PPE 500 is configured to determine the length (norm) of vector v because it performs the operation:

$$|v|=\sqrt{(a_2-a_1)^2+(b_2-b_1)^2}$$

for two-dimensional arrays and performs the operation:

$$|v|=\sqrt{(a_2-a_1)^2+(b_2-b_1)^2+(c_2-c_1)^2}$$

for three-dimensional arrays.

As known by those skilled in the art, direction of travel and length of vector per time unit determines speed and orientation in the projected plane. The resulting motion vectors computed by IPE 200 may require to be averaged out over time by PPE 500. Therefore, multiple readings may have to be taken and averaged. Thus, linear motions are easy to detect and average out.

Object motion is determined by PPE 500 since the PPE 500 tracks the objects. As described above, pixel changes are tracked and computed by IPE 200. IPE 200 is further adapted to track pixel motion or pixel changes over time or across the space stage. Because IPE 200 unifies both time and space stage computations, IPE 200 tracks object edge motions. IPE 200 detects vectors, such as edges, and motion vectors, by sequentially extending the starting and ending point of a line. A line or a perimeter is determined by comparing the line's gradient to a predefined threshold. PPE 500 receives the perimeter data detected by IPE 200 and associates these detected edges to their respective objects.

Since only the absolute value of the computed gradient is used, both points along the gradient—steepest incline and/or decline—are considered and used as points along a trajectory. This enables straight vectors, vectors with ragged edges along the horizontal axis, the vertical axis, and any linear combination of the two to be detected. The number of vectors delivered to the host is small compared to the number of pixels in an image since the rate of change is limited to the leading and the trailing object edge. All other pixels are static or quasi-static. Typically, an image containing 640×480 pixels, each represented by 24 bits, is reduced to a few hundred vectors of edges or detected motions.

As described above, FIG. 6 is a simplified high-level simplified block diagram of an image processing system 400, in accordance with one embodiment of the present invention. Image processing system 400 is shown as including, in part, a camera unit 405, a high-speed high-performance interconnect module 410, such as a PCI-X or 3GIO card, and host mainboard 420. Interconnect module 410 is further configured to include, in part, a realignment unit and frame buffer 412, one ore more IPE 200, and one ore more PPE 500. Host mainboard 420 is further configured to include, in part, a host DRAM 416, a high performance interconnect module 424, such as a PCI-X or 3GIO NorthBridge 424, and a host CPU 426. It is understood that each camera unit 405 may include a CCD (or other image capturing devices) as well as one ore more ADCs.

Data received from camera unit 405 is transmitted to the IPE(s) 200 via realignment unit and frame buffer 412. Realignment unit and frame buffer 412 may or may not store the frame data it receives, depending on the synchronization of the multiple ADCs disposed in camera unit 405. After a frame is realigned by realignment unit and frame buffer 412, IPE 200 starts to process the frame data. As described above, IPE 200 is adapted to detect edges, as well as differences in spatial state of the pixels and changes over time of the state of the pixels.

IPE 200 sends the detected results to PPE 500. PPE 500 is configured to compact this frame data further, if consecutive vectors are found, and to transmit this compressed frame data to the DMA controller disposed in interconnect module 424. Interconnect module 424, in turn, sends this frame data to the host DRAM 422. Host CPU 426 is configured to access the frame data stored in host DRAM 422. Therefore, in accordance with the present invention, host CPU 426 does not have to perform vector extraction, motion detection, or edge detection. Therefore, image processing system 400 has a significantly improved processing speed than conventional image processing systems. In some embodiments, image processing system 400 processes 10000 frames per second compared to most conventional image processing systems that can process 60 frames per second.

Because in accordance with the present invention, the image processing is partitioned into multiple layers, as shown in FIG. 3, an image processing system such as that shown in FIG. 6, which is partitioned to conform to these functional layers, is highly scalable and lends itself to easy integration. For example, as the feature size (e.g., transistor size) of each generation of manufactured technology reduces and scales down, the number of IPEs and PPEs that may be integrated on a single semiconductor substrate increases. Furthermore, partitioning of the image processing into multiple layers, as shown in FIG. 3, enables linear scalability of the frame size and the throughput. For example, if 4×N IPEs and N PPEs provide an inadequate frame size, then one can increase the number of IPEs to 4×M×N, and the number PPEs to M×N by just parallelizing them.

Applicant has discovered that sequential processing of image data, as performed by a conventional image processing system, results in inefficiencies and throughput limitations that the parallel image processing system of the present invention overcomes.

Attached Appendix A shows a comparison of ten cycles of how neighboring pixels are processed by a conventional image processing system vs. how similar neighboring pixels are processed by an image processing system of the present invention.

The above embodiments of the present invention are illustrative and not limitative. The invention is not limited by the type of image sensor or analog-to-digital converter. Nor is the invention limited to any specific type of process technology, e.g., CMOS, Bipolar, or BICMOS, or otherwise that may be used to manufacture the image processing system of the present invention. The invention is not limited by the type of processor, DMA controller, memory used in the image processing system. The invention is not limited by the algorithm used to determine motion vectors, perimeters, or gradients between any two scalars. Other additions, subtractions, deletions, and modifications may be made without departing from the scope of the present disclosure as set forth in the appended claims.

What is claimed is:

1. An image processing system comprising:
   a first processing layer operative to perform object-independent processing in a real time physical environment, wherein said object-independent processing is further operative to include a plurality of processors corresponding to the first processing layer, and wherein each of the plurality of the processors is associated with a different one of pixels of an image frame in order to perform per-pixel processing in order to enhance object distinguishing in a higher processing layer, said first processing layer being instantiated as a real-time-capable MPP SIMD;
   a second processing layer on top of said first processing layer and operative to perform object-dependent and pixel-independent processing in said real-time physical environment to obtain a dynamic feature set for use in object recognition, said dynamic feature set comprising object perimeters and static and dynamic object features, including linear and non-linear motion parameters, said second processing layer being instantiated as a real-time-capable SMP matrix multiplication processor combined with an SMP-type Fast Fourier Transform processor; and
   a third processing layer on top of said second processing layer and operative in real time to perform object recognition and association by employing said dynamic feature set against an object to be recognized.

2. The image processing system of claim 1 wherein each of the plurality of the processors operative to perform object independent processing is enabled to perform a unified and symmetric processing of N dimensions in space and one dimension in time.

3. The image processing system of claim 2 further comprising:
   an image capturing block.

4. The image processing system of claim 3 wherein the plurality of processors are formed on a first semiconductor substrate different from a second semiconductor substrate on which the image capturing block is formed.

5. The image processing system of claim 4 further comprising:
   a realignment buffer operative to realign the data received from first and second analog-to-digital converters disposed in the image capturing block.

6. A method for processing images comprising:
   performing object-independent processing in a first processing layer in a real time physical environment by means of a plurality of real-time-capable processors, each processor associated with a different one of pixels of an image frame being processed, in order to enhance object distinguishing in a higher second processing layer;
   performing object-dependent and pixel-independent processing in a second processing layer on top of said first processing layer in said real-time physical environment in order to guarantee to obtain a dynamic feature set in real time for use in object recognition, said dynamic feature set comprising object perimeters and static and dynamic object features, including linear and non-linear motion parameters; and
   performing in real time object recognition and association in a third processing layer on top of said second processing layer by employing said dynamic feature set against an object to be recognized.

7. The method of claim 6 further comprising:
   performing object-dependent processing by a symmetric multi-processor.

8. The method of claim 7 further comprising:
   performing object independent processing by a plurality of processors that form a massively parallel processing system.

9. The method of claim 8 wherein the massively parallel processing system is a systolic array type massively parallel processing system.

10. The method of claim 9 further comprising:
    configuring the systolic array massively parallel processing system as a single-instruction multiple-data system.

11. The method of claim 10 wherein each of the plurality of the processors is enabled to perform a unified and symmetric processing of N dimensions in space and one dimension in time.

12. The method of claim 11 further comprising:
    capturing the image frame on a first semiconductor substrate that is different from a second semiconductor substrate on which the plurality of processors are formed.

13. The method of claim 12 further comprising:
    converting analog data corresponding to the image frame to digital data; and
    realigning the converted digital data.

* * * * *